US012576677B2

(12) United States Patent

Whittle

(10) Patent No.: US 12,576,677 B2

(45) Date of Patent: Mar. 17, 2026

(54) CORROSION PROTECTION FOR AIRCRAFT WHEEL PNEUMATIC PORTS

(71) Applicant: Goodrich Corporation, Charlotte, NC (US)

(72) Inventor: Scottie G. Whittle, Springboro, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 525 days.

(21) Appl. No.: 18/083,259

(22) Filed: Dec. 16, 2022

(65) Prior Publication Data

US 2024/0198741 A1     Jun. 20, 2024

(51) Int. Cl.
B60C 29/06     (2006.01)

(52) U.S. Cl.
CPC .......... B60C 29/06 (2013.01); B60C 2200/02 (2013.01)

(58) Field of Classification Search
CPC ................................ B60C 29/02; B60C 29/06
See application file for complete search history.

(56) References Cited

U.S. PATENT DOCUMENTS

| | | | | |
|---|---|---|---|---|
| 2,744,559 A | * | 5/1956 | Leonetti | B60C 29/02 |
| | | | | 152/427 |
| 2,871,905 A | | 2/1959 | Stanton | |
| 2,988,126 A | * | 6/1961 | Wells | B60B 3/02 |
| | | | | 152/429 |
| 4,064,923 A | * | 12/1977 | German | B60C 29/02 |
| | | | | 152/415 |

| | | | | |
|---|---|---|---|---|
| 4,106,543 A | * | 8/1978 | Sano | B60B 25/22 |
| | | | | 152/405 |
| 4,453,776 A | * | 6/1984 | Rohr | B60B 21/00 |
| | | | | 301/95.108 |
| 4,793,374 A | * | 12/1988 | Earley | B60C 29/04 |
| | | | | 137/234.5 |
| 5,844,131 A | * | 12/1998 | Gabelmann | B60C 23/0494 |
| | | | | 73/146.8 |
| 7,458,648 B2 | | 12/2008 | Esposito et al. | |
| 8,047,247 B2 | * | 11/2011 | Palaoro | B60C 29/02 |
| | | | | 152/427 |
| 8,511,332 B2 | * | 8/2013 | Robert | B60C 29/02 |
| | | | | 137/227 |
| 2005/0178437 A1 | | 8/2005 | Schultz | |

(Continued)

FOREIGN PATENT DOCUMENTS

| | | |
|---|---|---|
| EP | 0547848 | 9/1995 |
| GB | 836286 | 6/1960 |

OTHER PUBLICATIONS

European Patent Office, European Search Report dated May 21, 2024 in Application No. 23214389.1.

*Primary Examiner* — Jason R Bellinger

(74) *Attorney, Agent, or Firm* — SNELL & WILMER L.L.P.

(57) ABSTRACT

A wheel assembly is provided that includes a structure defining a wheel portion configured to receive a portion of a tire. The wheel assembly further includes a structure of the wheel portion defining an air channel from a face of the wheel portion to an area that receives the portion of the tire, an end of the air channel proximate to the face being configured to receive a valve, where the structure is further configured to receive a corrosion mitigation device within the air channel.

20 Claims, 12 Drawing Sheets

(56)        References Cited

U.S. PATENT DOCUMENTS

2007/0017595 A1*  1/2007  Arno ...................... B60S 5/043
                                                        141/38
2018/0126806 A1    5/2018  Palaoro
2022/0388356 A1   12/2022  Moline et al.

* cited by examiner

200

201    204    202

208

209

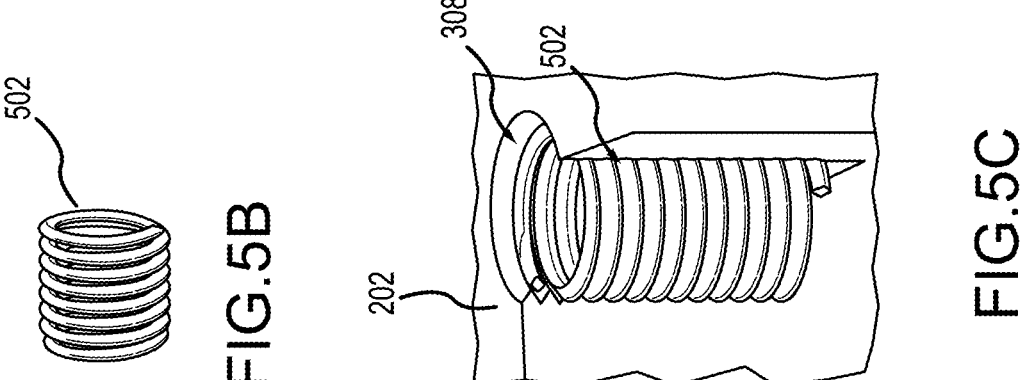
FIG.5B
FIG.5C
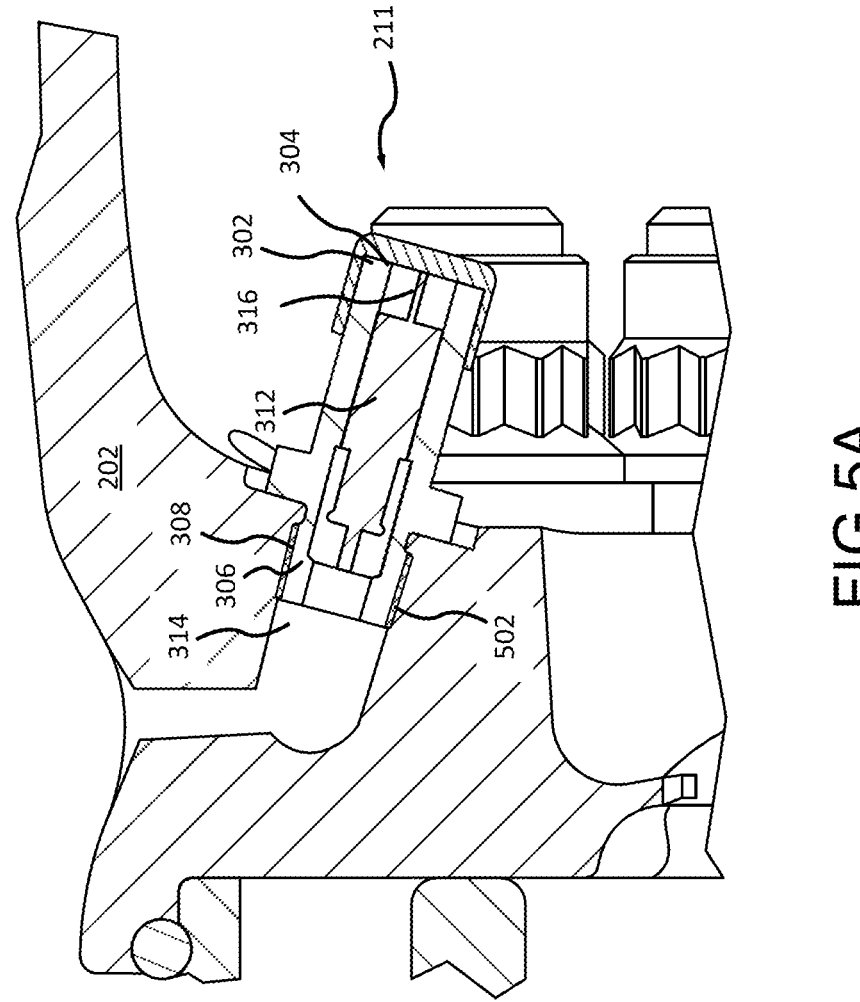
FIG.5A

918

212

902

904

916

914

918

912

910

908

906

202

CORROSION PROTECTION FOR AIRCRAFT WHEEL PNEUMATIC PORTS

FIELD

The present disclosure generally relates to pneumatic ports, and more particularly, to corrosion protection for aircraft wheel pneumatic ports.

BACKGROUND

Many aircraft include landing gear for supporting the aircraft above a ground surface and for allowing the aircraft to move relative to the ground surface while remaining supported by the ground surface. Each landing gear may include one or more wheel assemblies that may each receive an aircraft tire. Each wheel assembly may be split wheel assemblies, for example, and may have an inboard wheel portion and an outboard wheel portion. Such wheel portions of a split wheel are often held together using a plurality of tie bolts. Each wheel assembly may include at least one pneumatic port, such as an inflation valve for inflating the aircraft tire, an over-inflation pressure relief valves to prevent over-inflation of the aircraft tire, and a tire pressure monitoring system (TPMS) sensor that may communicate wirelessly with a controller of the aircraft.

SUMMARY

A wheel assembly is disclosed herein. The wheel assembly includes a structure defining a wheel portion configured to receive a portion of a tire; and a structure of the wheel portion defining an air channel from a face of the wheel portion to an area that receives the portion of the tire, an end of the air channel proximate to the face being configured to receive a valve, wherein the structure is further configured to receive a corrosion mitigation device within the air channel.

In various embodiments, the corrosion mitigation device is positioned in in an entry to the air channel, the entry being substantially near the face of the wheel portion, the air channel being configured to receive the valve, the corrosion mitigation device being located between the wheel assembly and the valve. In various embodiments, the corrosion mitigation device is annular shaped. In various embodiments, the corrosion mitigation device is positioned in an entry to the air channel substantially near the area that receives the portion of the tire. In various embodiments, the corrosion mitigation device is tubular shaped.

In various embodiments, the corrosion mitigation device is configured to be positioned between threads of the wheel assembly configured to receive the valve and threads on an exterior of the valve. In various embodiments, the corrosion mitigation device is helically shaped to align with the threads of the wheel assembly and the threads on the exterior of the valve. In various embodiments, the corrosion mitigation device is an anodic device. In various embodiments, the corrosion mitigation device is a desiccant device.

Also disclosed herein is a landing gear of an aircraft, including: a wheel assembly, the wheel assembly including: a structure defining a wheel portion configured to receive a portion of a tire; and a structure of the wheel portion defining an air channel from a face of the wheel portion to an area that receives the portion of the tire, an end of the air channel proximate to the face being configured to receive a valve, wherein the structure is further configured to receive a corrosion mitigation device within the air channel.

In various embodiments, the corrosion mitigation device is positioned in in an entry to the air channel, the entry being substantially near the face of the wheel portion, the air channel being configured to receive the valve, the corrosion mitigation device being located between the wheel assembly and the valve. In various embodiments, the corrosion mitigation device is annular shaped. In various embodiments, the corrosion mitigation device is positioned in an entry to the air channel substantially near the area that receives the portion of the tire. In various embodiments, the corrosion mitigation device is tubular shaped.

In various embodiments, the corrosion mitigation device is configured to be positioned between threads of the wheel assembly configured to receive the valve and threads on an exterior of the valve. In various embodiments, the corrosion mitigation device is helically shaped to align with the threads of the wheel assembly and the threads on the exterior of the valve. In various embodiments, the corrosion mitigation device is an anodic device. In various embodiments, the corrosion mitigation device is a desiccant device.

Also disclosed herein is an aircraft including: a landing gear, where the landing gear includes a wheel assembly, the wheel assembly including: a structure defining a wheel portion configured to receive a portion of a tire; and a structure of the wheel portion defining an air channel from a face of the wheel portion to an area that receives the portion of the tire, an end of the air channel proximate to the face being configured to receive a valve, wherein the structure is further configured to receive a corrosion mitigation device within the air channel. In various embodiments, the corrosion mitigation device is an anodic device or a desiccant device.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 5A illustrates a cross-sectional view of an inflation valve taken along section line B-B of the wheel assembly of FIG. 2B, in accordance with various embodiments.

FIGS. 5B and 5C illustrate a threaded corrosion mitigation device of FIG. 5A, in accordance with various embodiments.

DETAILED DESCRIPTION

Figure 1:
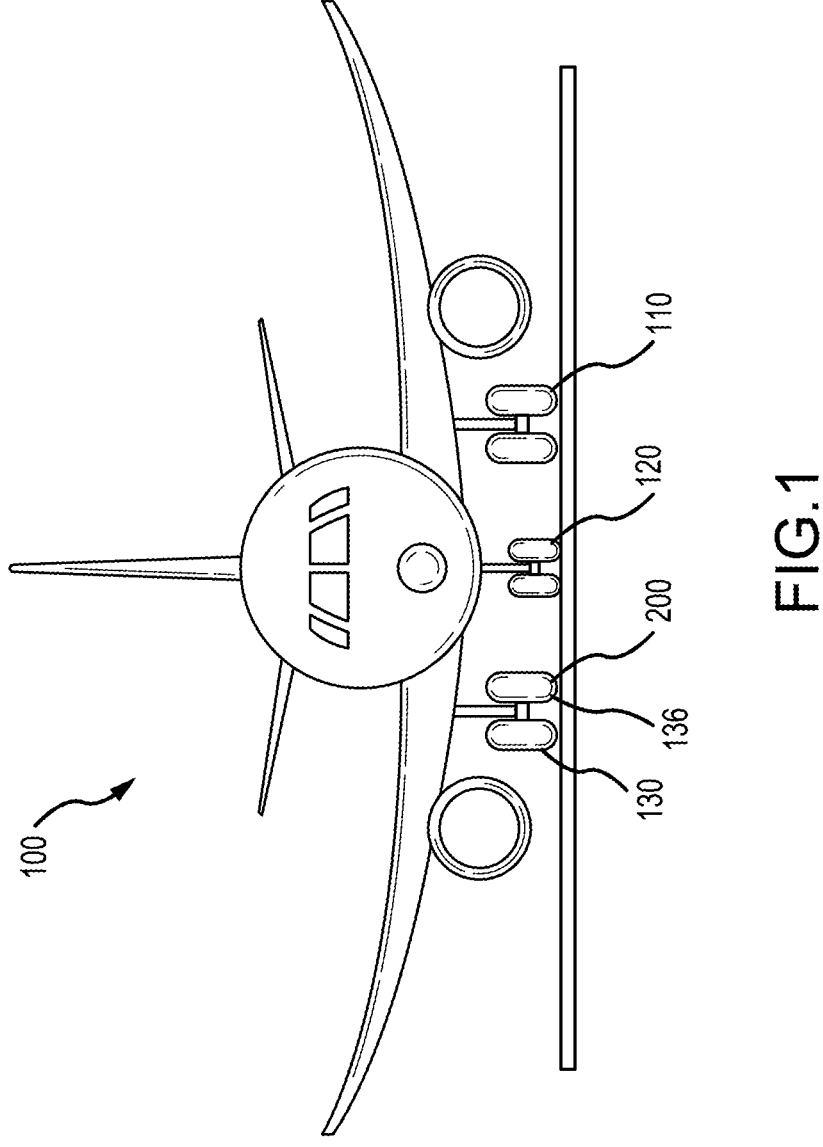
FIG. 1 illustrates an aircraft having multiple landing gear, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Many aircraft include landing gear for supporting the aircraft above a ground surface and for allowing the aircraft to move relative to the ground surface while remaining supported by the ground surface. Each landing gear may include one or more wheel assemblies that may each receive an aircraft tire. Each wheel assembly may include at least one pneumatic port, such as an inflation valve for inflating the aircraft tire, an over-inflation pressure relief valves to prevent over-inflation of the aircraft tire, and a tire pressure monitoring system (TPMS) sensor that may communicate wirelessly with a controller of the aircraft. Corrosion in the pneumatic ports of an aircraft wheel is common due to difficulty in anodizing the pneumatic ports and an inability to apply primer and topcoat paint systems to surfaces associated with the pneumatic ports. Furthermore, superficial corrosion associated with a pneumatic port must be removed as part of maintenance; however, such corrosion is difficult to inspect and thus identify. If such corrosion goes undetected, corrosion pitting may occur that entails expensive rework or that may lead to cracking or scraping the aircraft wheel. The cause of corrosion is believed to be moisture that may be introduced during maintenance activities, which may enter the areas associated with the pneumatic ports.

Disclosed herein is a pneumatic port assembly that includes a corrosion mitigation device, such as an anodic device or a desiccant device, among others. In various embodiments, the anodic device is a metal device that easily absorbs moisture that is present and corrodes thereby preventing corrosion of other parts of the pneumatic port assembly. That is, in various embodiments, the anodic device is metal substance that has a lower galvanic potential than the surrounding structure the anodic device protects. In that regard, the anodic device may be composed of less noble metals such as magnesium, zinc, beryllium, aluminum alloys, among others. In various embodiments, the desiccant device is a hygroscopic substance disposed within a structure that is used to induce or sustain a state of dryness (desiccation) in its vicinity. In various embodiments, the desiccant may be silica gel, activated charcoal, calcium sulfate, calcium chloride, molecular sieves, among others. In various embodiments, the corrosion mitigation device is added to the pneumatic port assembly to mitigate corrosion within the pneumatic port due to moisture that may enter areas of the pneumatic port. In various embodiments, the corrosion mitigation device may be in the form of a tubular shaped insert, an annular shaped insert, or a threaded insert, among others, that are easily replaceable during maintenance.

Referring now to FIG. 1, an aircraft 100 in accordance with various embodiments can include multiple landing gear including a first landing gear 110, a second landing gear 120 and a third landing gear 130. Each landing gear may include one or more wheel assemblies 200 (FIG. 3). For example, the third landing gear 130 may include an inner/inboard wheel assembly and an outer/outboard wheel assembly. Each wheel assembly of the aircraft 100 may be designed to receive a tire. For example, a tire 136 may be placed about an outer circumference of wheel assembly 200 and inflated.

Figure 2A:
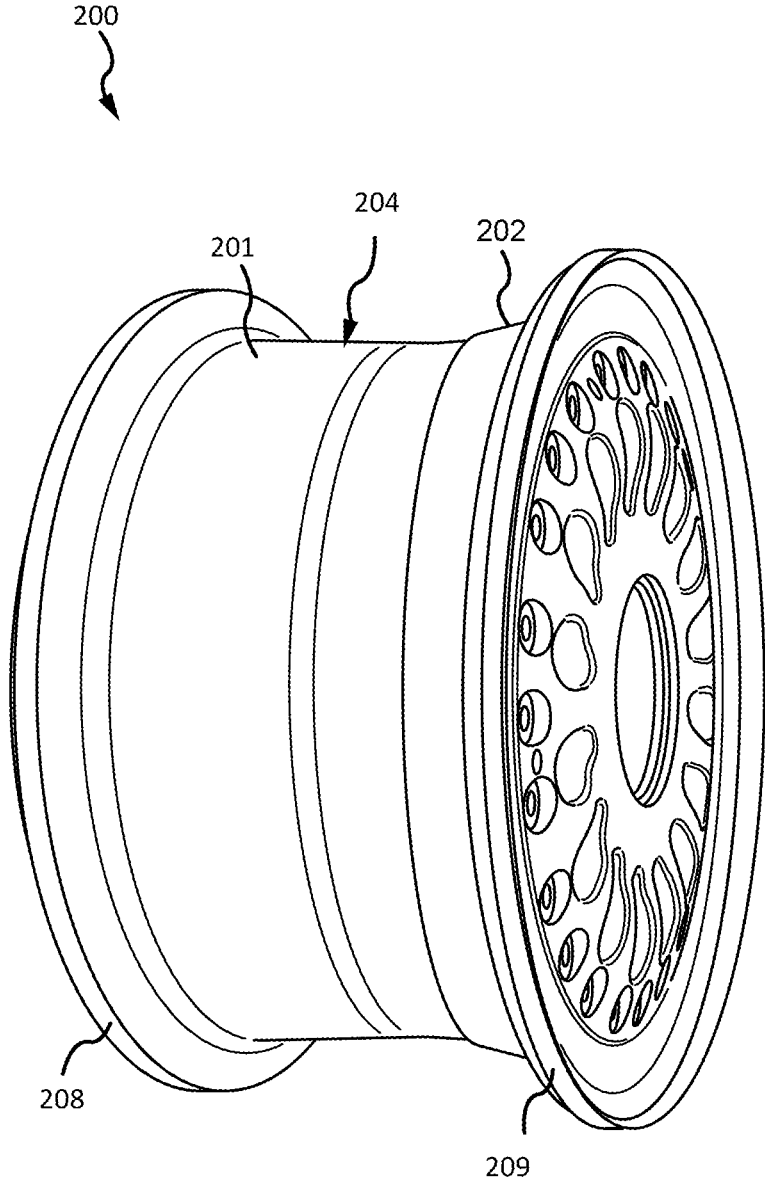
FIGS. 2A and 2B illustrate a wheel assembly that includes a split wheel including of a first wheel portion and a second wheel portion, according to various embodiments.
Figure 2B:
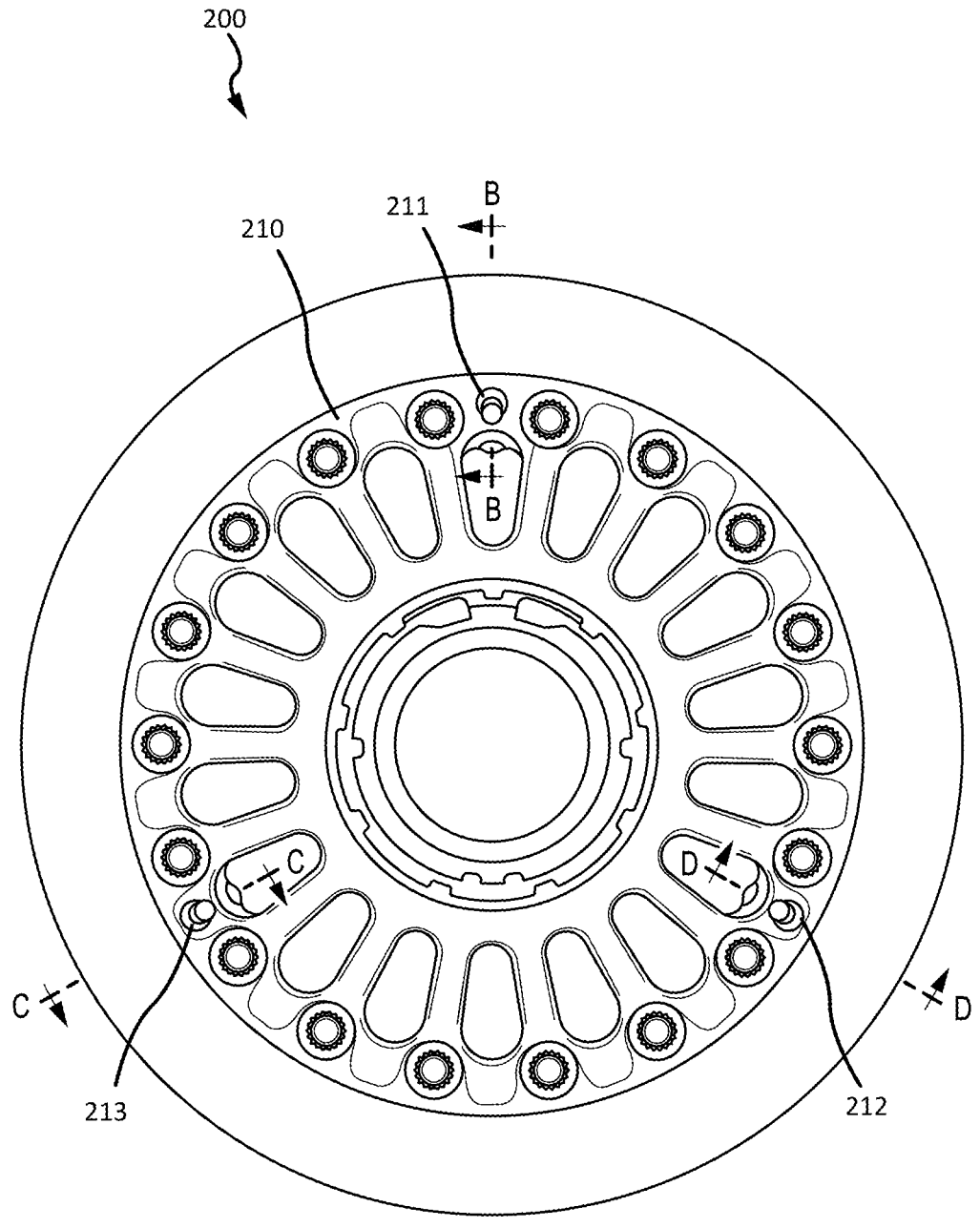

Referring now to FIGS. 2A and 2B, wheel assembly 200 includes a split wheel including of a first wheel portion 201 and a second wheel portion 202, according to various embodiments. That is, wheel assembly 200 may include a split wheel having multiple wheel portions, such as an inboard wheel portion and an outboard wheel portion. Wheel portions 201, 202, for example, may be referred to as wheel halves (e.g., the first wheel portion 201 may be referred to as an inboard wheel half and the second wheel portion 202 may be referred to as an outboard wheel half). The wheel assembly 200 may be implemented with any landing gear of the aircraft 100 (e.g., any of the three landing gears mentioned above), and the wheel assembly 200 may be an inner/inboard wheel assembly or an outer/outboard assembly. Although numerous details are included herein pertaining to the implementation of the wheel assembly 200 in an aircraft, one skilled in the art will realize that a similar wheel assembly may be used in other vehicles, such as cars or motorcycles, and thus the scope of the present disclosure is not necessarily limited to aircraft wheel assemblies.

In various embodiments, wheel assembly 200 also defines a tube-well 204. Tube-well 204 may be defined by respective flange sections of the first wheel portion 201 and the second wheel portion 202. Tube-well 204 may be configured to receive a tire and may form a seal with tire to allow pressurized air to inflate the tire. In various embodiments, the first wheel portion 201 also includes a radially outward extending lip or rim 208 located at an inboard end of the first wheel portion 201, and the second wheel portion 202 may also include a similar radially outward extending lip or rim 209 located at an outboard end of the second wheel portion 202. In various embodiments, a face 210 of the wheel assembly 200 may include one or more threaded portions to receive an inflation valve 211, over-inflation pressure relief valve 212, a tire pressure monitoring system (TPMS) valve 213, among others.

Figure 3B:
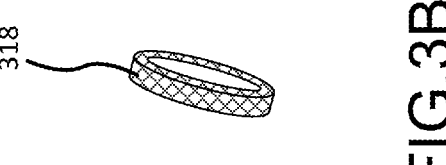
FIG. 3B illustrates an isometric view of a corrosion mitigation device of FIG. 3A, in accordance with various embodiments.
Figure 3A:
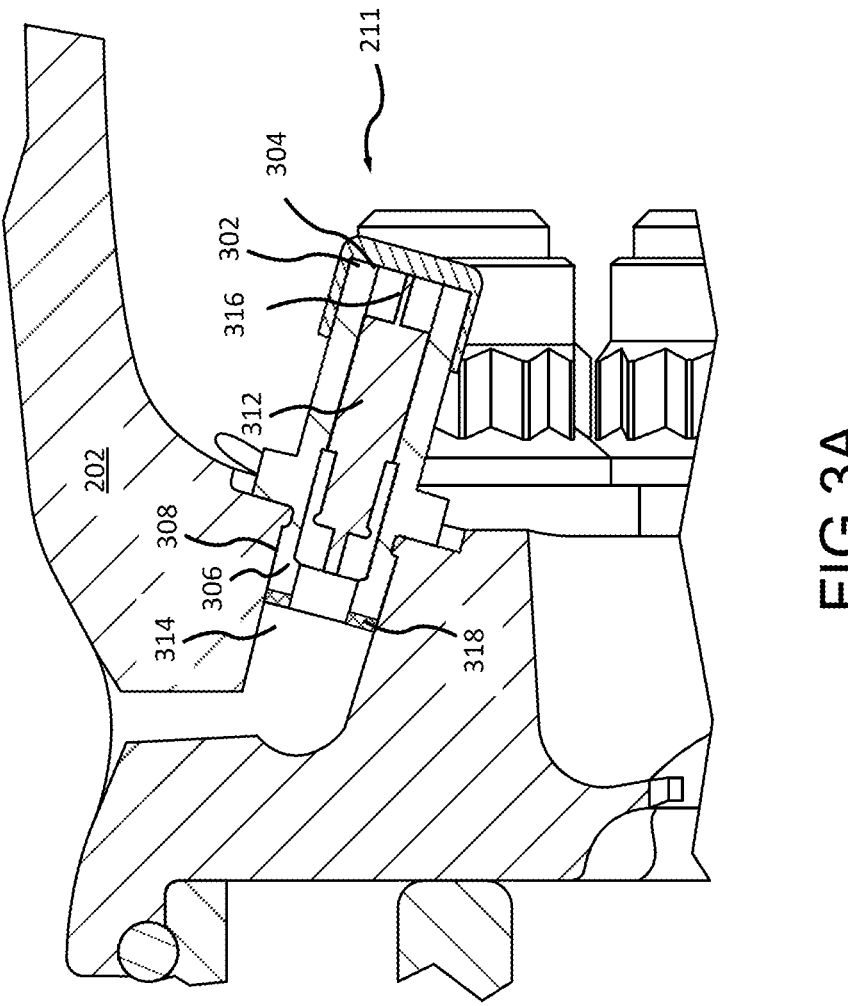
FIG. 3A illustrates a cross-sectional view of an inflation valve taken along section line B-B of the wheel assembly of FIG. 2B, in accordance with various embodiments.

Referring now to FIG. 3A, a cross-sectional view of the inflation valve 211 taken along section line B-B of the wheel assembly 200 of FIG. 2B is illustrated, in accordance with various embodiments. In various embodiments, the inflation valve 211 may include a post 302 that includes a first end 304 and a second end 306. In various embodiments, the second end 306 may be removably fitted within a boundary defining a void 308 of the second wheel portion 202, such as by threaded attachment. In various embodiments, the post 302 may include an air channel 312, located generally along the long axis of the post 302, that allows air to flow through the post 302. In various embodiments, mounting of a second end 306 of the post 302 into the boundary defining the void 308 of the second wheel portion 202 may allow air to flow between the air channel 312 of the post 302 and air channel 314 of the second wheel portion 202. In various embodiments, a valve core 316 may be removably mounted, such as by threading, within the first end 304 the post 302. In various embodiments, the valve core 316 may include a one-way valve that permits air to flow into the air channel 312 in one direction, but not the other. In the disclosed example, the valve core 316 may allow air to flow into the air channel 312 through the first end 304 of the post 302, but not in the other direction. In various embodiments, the inflation valve 211 may further include corrosion mitigation device 318 disposed within the air channel 314 at the second end 306 of post 302. In various embodiments, the corrosion mitigation device 318 is an annular shaped device that permits air to flow from the air channel 312 into the air channel 314. Referring temporarily to FIG. 3B, an isometric view of the corrosion mitigation device 318 of FIG. 3A is illustrated, in accordance with various embodiments. In various embodiments, the corrosion mitigation device 318 is an anodic device or a desiccant device, among others that absorbs moisture to mitigate corrosion within the pneumatic port.

Figure 4B:
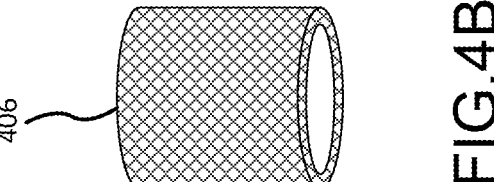
FIG. 4B illustrates an isometric view of a corrosion mitigation device of FIG. 4A, in accordance with various embodiments.
Figure 4A:
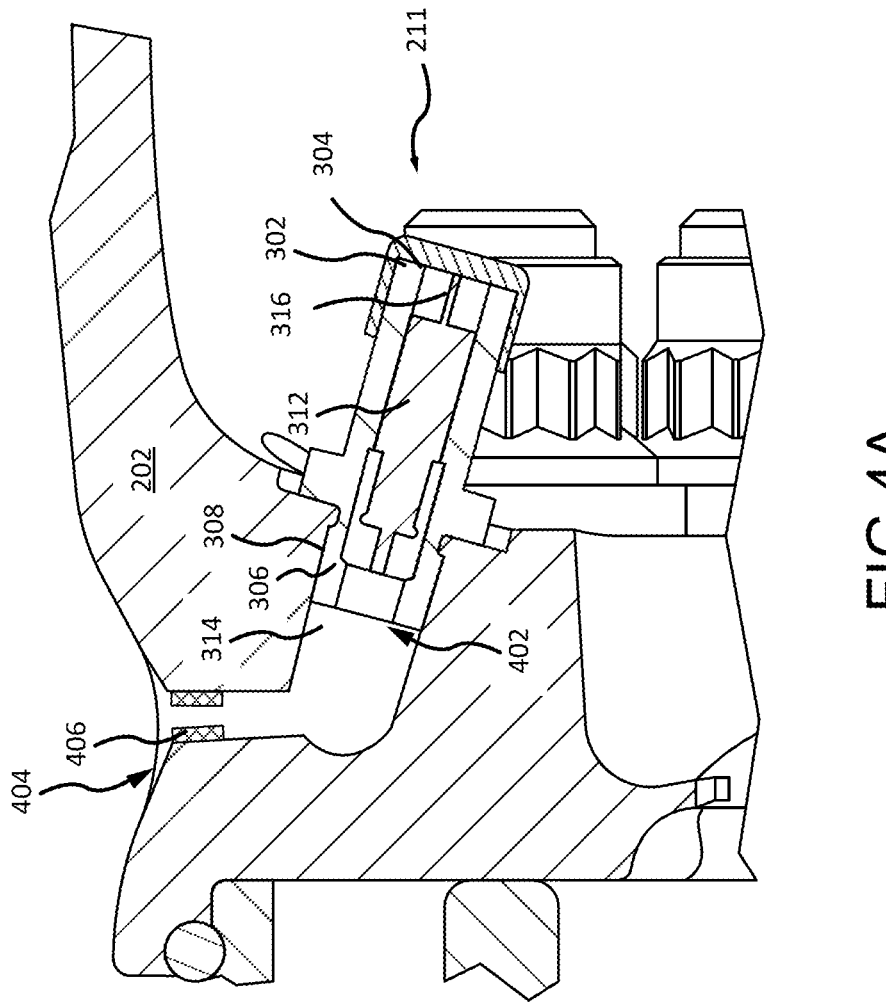
FIG. 4A illustrates a cross-sectional view of an inflation valve taken along section line B-B of the wheel assembly of FIG. 2B, in accordance with various embodiments.

Referring now to FIG. 4A, a cross-sectional view of the inflation valve 211 taken along section line B-B of the wheel assembly 200 of FIG. 2B is illustrated, in accordance with various embodiments. In various embodiments, the inflation valve 211 may include a post 302 that includes a first end 304 and a second end 306. In various embodiments, the second end 306 may be removably fitted within a boundary defining a void 308 of the second wheel portion 202, such as by threaded attachment. In various embodiments, the post 302 may include an air channel 312, located generally along the long axis of the post 302, that allows air to flow through the post 302. In various embodiments, mounting of a second end 306 of the post 302 into the boundary defining the void 308 of the second wheel portion 202 may allow air to flow between the air channel 312 of the post 302 and air channel 314 of the second wheel portion 202. In various embodiments, a valve core 316 may be removably mounted, such as by threading, within the first end 304 the post 302. In various embodiments, the valve core 316 may include a one-way valve that permits air to flow into the air channel 312 in one direction, but not the other. In the disclosed example, the valve core 316 may allow air to flow into the air channel 312 through the first end 304 of the post 302, but not in the other direction. In various embodiments, air channel 314 of the second wheel portion 202 includes a first end 402 and a second end 404. In various embodiments, a corrosion mitigation device 406 may be fitted into the second end 404 of the air channel 314 substantially near an area that receives at least a portion of a tire. In various embodiments, the corrosion mitigation device 406 has a tubular shape that permits air coming from the air channel 312 through the air channel 314. Referring temporarily to FIG. 4B, an isometric view of the corrosion mitigation device 406 of FIG. 4A is illustrated, in accordance with various embodiments. In various embodiments, the corrosion mitigation device 406 is an anodic device or a desiccant device, among others that absorbs moisture to mitigate corrosion within the pneumatic port.

Referring now to FIG. 5A, a cross-sectional view of the inflation valve 211 taken along section line B-B of the wheel assembly 200 of FIG. 2B is illustrated, in accordance with various embodiments. In various embodiments, the inflation valve 211 may include a post 302 that includes a first end 304 and a second end 306. In various embodiments, the second end 306 may be removably fitted within a boundary defining a void 308 of the second wheel portion 202, such as by threaded attachment. In various embodiments, the post 302 may include an air channel 312, located generally along the long axis of the post 302, that allows air to flow through the post 302. In various embodiments, mounting of a second end 306 of the post 302 into the boundary defining the void 308 of the second wheel portion 202 may allow air to flow between the air channel 312 of the post 302 and air channel 314 of the second wheel portion 202. In various embodiments, a valve core 316 may be removably mounted, such as by threading, within the first end 304 the post 302. In various embodiments, the valve core 316 may include a one-way valve that permits air to flow into the air channel 312 in one direction, but not the other. In the disclosed example, the valve core 316 may allow air to flow into the air channel 312 through the first end 304 of the post 302, but not in the other direction. In various embodiments, the inflation valve 211 may further include corrosion mitigation device 502. In various embodiments, corrosion mitigation device 502 may be a threaded insert with a helical shape, such as a helical coil as illustrated in FIG. 5B. The corrosion mitigation device 502 is inserted into threads of the boundary defining the void 308 of the second wheel portion 202, as illustrated in FIG. 5C, with the second end 306 of the post 302 threading into the corrosion mitigation device 502. In various embodiments, the corrosion mitigation device 502 is an anodic device or a desiccant device, among others that absorbs moisture to mitigate corrosion within the pneumatic port.

Figure 6B:
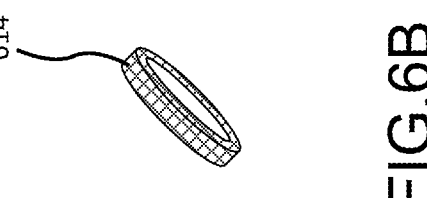
FIG. 6B illustrates an isometric view of a corrosion mitigation device of FIG. 6A, in accordance with various embodiments.
Figure 6A:
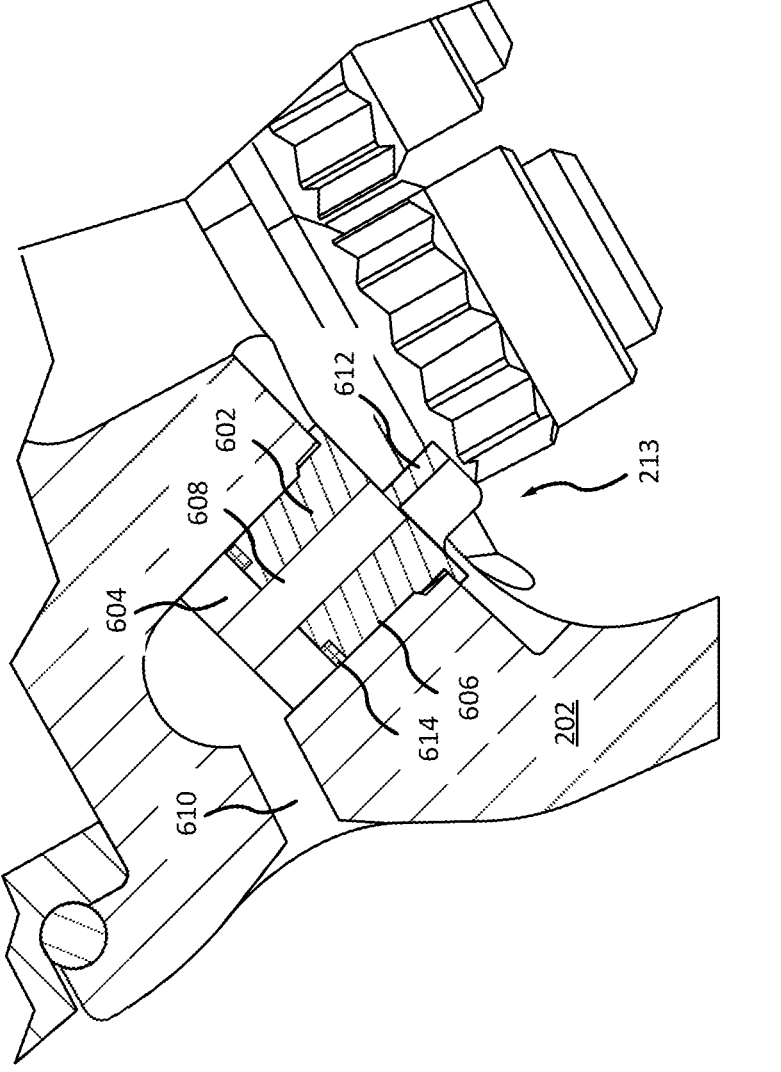
FIG. 6A illustrates a cross-sectional view of the tire pressure monitoring system (TPMS) valve taken along section line C-C of the wheel assembly of FIG. 2B, in accordance with various embodiments.

Referring now to FIG. 6A, a cross-sectional view of the tire pressure monitoring system (TPMS) valve 213 taken along section line C-C of the wheel assembly 200 of FIG. 2B is illustrated, in accordance with various embodiments. In various embodiments, the TPMS valve 213 may include a pressure protector valve 602 fluidly coupled to a pressure duct 604. In various embodiments, the pressure protector valve 602 may be removably fitted within a boundary defining a void 606 of the second wheel portion 202, such as by threaded attachment. In various embodiments, the pressure protector valve 602 may include an air channel 608, located generally along the long axis of the pressure protector valve 602, that allows air to flow through the pressure protector valve 602. In various embodiments, mounting of the pressure protector valve 602 into the boundary defining the void 606 of the second wheel portion 202 may allow air to flow between the air channel 608 of the pressure protector valve 602 and air channel 610 of the second wheel portion 202. In various embodiments, a valve core 612 may be removably mounted, such as by threading, within the pressure protector valve 602. In various embodiments, the valve core 612 may include a one-way valve that permits air to flow into the air channel 608 in one direction, but not the other. In the disclosed example, the valve core 612 may allow air to flow into the air channel 608 through the pressure protector valve 602, but not in the other direction. In various embodiments, the pressure protector valve 602 may further include corrosion mitigation device 614 configured to be disposed proximate the air channel 610 when the pressure protector valve 602 is fluidly coupled to the pressure duct 604. In various embodiments, the corrosion mitigation device 614 is annular shaped device that permits air to flow from the air channel 608 into the air channel 610. Referring temporarily to FIG. 6B, an isometric view of the corrosion mitigation device 614 of FIG. 3A is illustrated, in accordance with various embodiments. In various embodiments, the corrosion mitigation device 614 is an anodic device or a desiccant device, among others that absorbs moisture to mitigate corrosion within the pneumatic port.

Figure 7B:
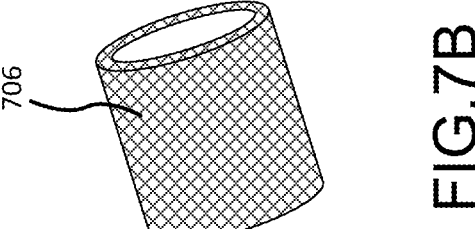
FIG. 7B illustrates an isometric view of a corrosion mitigation device of FIG. 7A, in accordance with various embodiments.
Figure 7A:
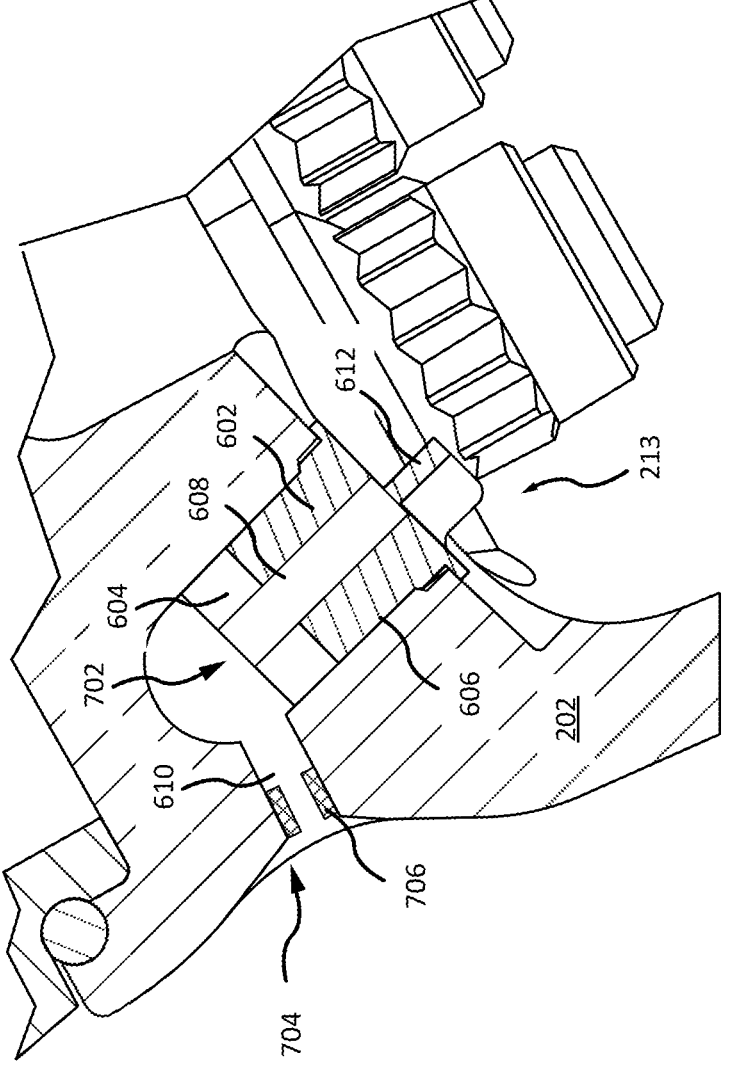
FIG. 7A illustrates a cross-sectional view of the tire pressure monitoring system (TPMS) valve taken along section line C-C of the wheel assembly of FIG. 2B, in accordance with various embodiments.

Referring now to FIG. 7A, a cross-sectional view of the tire pressure monitoring system (TPMS) valve 213 taken along section line C-C of the wheel assembly 200 of FIG. 2B is illustrated, in accordance with various embodiments. In various embodiments, the TPMS valve 213 may include a pressure protector valve 602 fluidly coupled to a pressure duct 604. In various embodiments, the pressure protector valve 602 may be removably fitted within a boundary defining a void 606 of the second wheel portion 202, such as by threaded attachment. In various embodiments, the pressure protector valve 602 may include an air channel 608, located generally along the long axis of the pressure protector valve 602, that allows air to flow through the pressure protector valve 602. In various embodiments, mounting of the pressure protector valve 602 into the boundary defining the void 606 of the second wheel portion 202 may allow air to flow between the air channel 608 of the pressure protector valve 602 and air channel 610 of the second wheel portion 202. In various embodiments, a valve core 612 may be removably mounted, such as by threading, within the pressure protector valve 602. In various embodiments, the valve core 612 may include a one-way valve that permits air to flow into the air channel 608 in one direction, but not the other. In the disclosed example, the valve core 612 may allow air to flow into the air channel 608 through the pressure protector valve 602, but not in the other direction. In various embodiments, air channel 610 of the second wheel portion 202 includes a first end 702 and a second end 704. In various embodiments, a corrosion mitigation device 706 may be fitted into the second end 704 of the air channel 610 substantially near an area that receives at least a portion of a tire. In various embodiments, the corrosion mitigation device 706 has a tubular shape that permits air to travel therethrough and through the air channel 610 and the air channel 608. Referring temporarily to FIG. 7B, an isometric view of the corrosion mitigation device 706 of FIG. 4A is illustrated, in accordance with various embodiments. In various embodiments, the corrosion mitigation device 706 is an anodic device or a desiccant device, among others that absorbs moisture to mitigate corrosion within the pneumatic port.

Figures 8A, 8B, 8C:
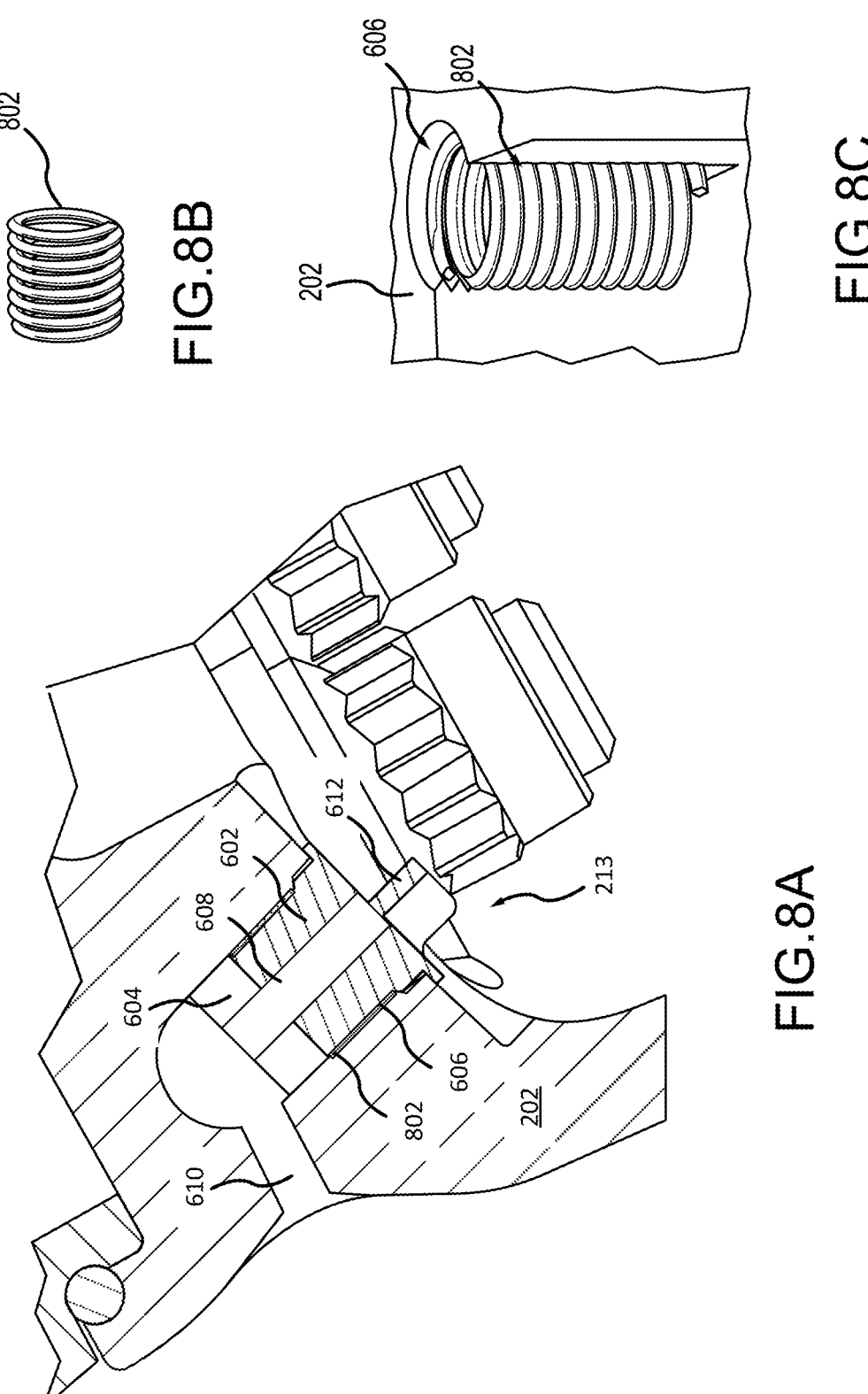
FIG. 8A illustrates a cross-sectional view of the tire pressure monitoring system (TPMS) valve taken along section line C-C of the wheel assembly of FIG. 2B, in accordance with various embodiments.
FIGS. 8B and 8C illustrate a threaded corrosion mitigation device of FIG. 8A, in accordance with various embodiments.

Referring now to FIG. 8A, a cross-sectional view of the tire pressure monitoring system (TPMS) valve 213 taken along section line C-C of the wheel assembly 200 of FIG. 2B is illustrated, in accordance with various embodiments. In various embodiments, the TPMS valve 213 may include a pressure protector valve 602 fluidly coupled to a pressure duct 604. In various embodiments, the pressure protector valve 602 may be removably fitted within a boundary defining a void 606 of the second wheel portion 202, such as by threaded attachment. In various embodiments, the pressure protector valve 602 may include an air channel 608, located generally along the long axis of the pressure protector valve 602, that allows air to flow through the pressure protector valve 602. In various embodiments, mounting of the pressure protector valve 602 into the boundary defining the void 606 of the second wheel portion 202 may allow air to flow between the air channel 608 of the pressure protector valve 602 and air channel 610 of the second wheel portion 202. In various embodiments, a valve core 612 may be removably mounted, such as by threading, within the pressure protector valve 602. In various embodiments, the valve core 612 may include a one-way valve that permits air to flow into the air channel 608 in one direction, but not the other. In the disclosed example, the valve core 612 may allow air to flow into the air channel 608 through the pressure protector valve 602, but not in the other direction. In various embodiments, the pressure protector valve 602 may further include corrosion mitigation device 802. In various embodiments, corrosion mitigation device 802 may be a threaded insert with a helical shape, such as a helical coil as illustrated in FIG. 5B. The corrosion mitigation device 802 is inserted into threads of the boundary defining the void 606 of the second wheel portion 202, as illustrated in FIG. 5C, with valve 602 threading into the corrosion mitigation device 802. In various embodiments, the corrosion mitigation device 802 is an anodic device or a desiccant device, among others that absorbs moisture to mitigate corrosion within the pneumatic port.

Figures 9A, 9B:
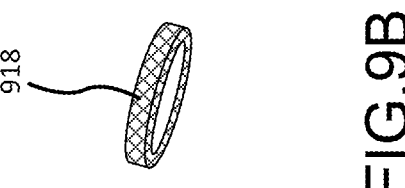
FIG. 9A illustrates a cross-sectional view of the over-inflation pressure relief valve taken along section line D-D of the wheel assembly of FIG. 2B, in accordance with various embodiments.
FIG. 9B illustrates an isometric view of a corrosion mitigation device of FIG. 9A, in accordance with various embodiments.

Referring now to FIG. 9A, a cross-sectional view of the over-inflation pressure relief valve 212 taken along section line D-D of the wheel assembly 200 of FIG. 2B is illustrated, in accordance with various embodiments. In various embodiments, the over-inflation pressure relief valve 212 may include a post 902 that includes a first portion 904 and a second portion 906. In various embodiments, the second portion 906 may be removably fitted within a boundary defining a void 908 of the second wheel portion 202, such as by threaded attachment. In various embodiments, the post 902 may include a diaphragm 910. In various embodiments, the diaphragm 910 is seated when the tire cavity air pressure is at or below the rated pressure for the tire. In various embodiments, when the tire cavity air pressure rises above a desired air pressure level in the tire, the diaphragm 910 rises allow in air to move from the air channel 912 of the second wheel portion 202 through the air channel 914 located generally along the long axis of the post 902 and out through boundaries defining voids 916 in the first portion 904 of the post 902. In various embodiments, mounting of a second portion 906 of the post 902 into the boundary defining the void 908 of the second wheel portion 202 may allow air to flow between the air channel 914 of the post 902 and air channel 912 of the second wheel portion 202. In various embodiments, over-inflation pressure relief valve 212 may further include corrosion mitigation device 918 disposed at the second end 906 of post 902 within the air channel 912. In various embodiments, the corrosion mitigation device 918 is annular shaped device that permits air to flow from the air channel 912 into the air channel 914. Referring temporarily to FIG. 9B, an isometric view of the corrosion mitigation device 918 of FIG. 9A is illustrated, in accordance with various embodiments. In various embodiments, the corrosion mitigation device 918 is an anodic device or a desiccant device, among others that absorbs moisture to mitigate corrosion within the pneumatic port.

Figures 10A, 10B:
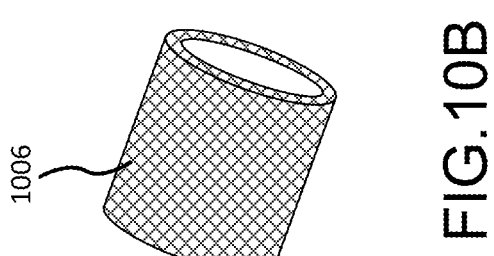
FIG. 10A illustrates a cross-sectional view of the over-inflation pressure relief valve taken along section line D-D of the wheel assembly of FIG. 2B, in accordance with various embodiments.
FIG. 10B illustrates an isometric view of a corrosion mitigation device of FIG. 10A, in accordance with various embodiments.

Referring now to FIG. 10A, a cross-sectional view of the over-inflation pressure relief valve 212 taken along section line D-D of the wheel assembly 200 of FIG. 2B is illustrated, in accordance with various embodiments. In various embodiments, the over-inflation pressure relief valve 212 may include a post 902 that includes a first portion 904 and a second portion 906. In various embodiments, the second portion 906 may be removably fitted within a boundary defining a void 908 of the second wheel portion 202, such as by threaded attachment. In various embodiments, the post 902 may include a diaphragm 910. In various embodiments, the diaphragm 910 is seated when the tire cavity air pressure is at or below the rated pressure for the tire. In various embodiments, when the tire cavity air pressure rises above a desired air pressure level in the tire, the diaphragm 910 rises allow in air to move from the air channel 912 of the second wheel portion 202 through the air channel 914 located generally along the long axis of the post 902 and out through boundaries defining voids 916 in the first portion 904 of the post 902. In various embodiments, mounting of a second portion 906 of the post 902 into the boundary defining the void 908 of the second wheel portion 202 may allow air to flow between the air channel 914 of the post 902 and air channel 912 of the second wheel portion 202. In various embodiments, air channel 912 of the second wheel portion 202 includes a first end 1002 and a second end 1004. In various embodiments, a corrosion mitigation device 1006 may be fitted into the second end 1004 of the air channel 912 substantially near an area that receives at least a portion of a tire. In various embodiments, the corrosion mitigation device 1006 has a tubular shape that permits air to flow therethrough and through the air channel 912 and into the air channel 914. Referring temporarily to FIG. 10B, an isometric view of the corrosion mitigation device 1006 of FIG. 10A is illustrated, in accordance with various embodiments. In various embodiments, the corrosion mitigation device 1006 is an anodic device or a desiccant device, among others that absorbs moisture to mitigate corrosion within the pneumatic port.

Figures 11A, 11B, 11C:
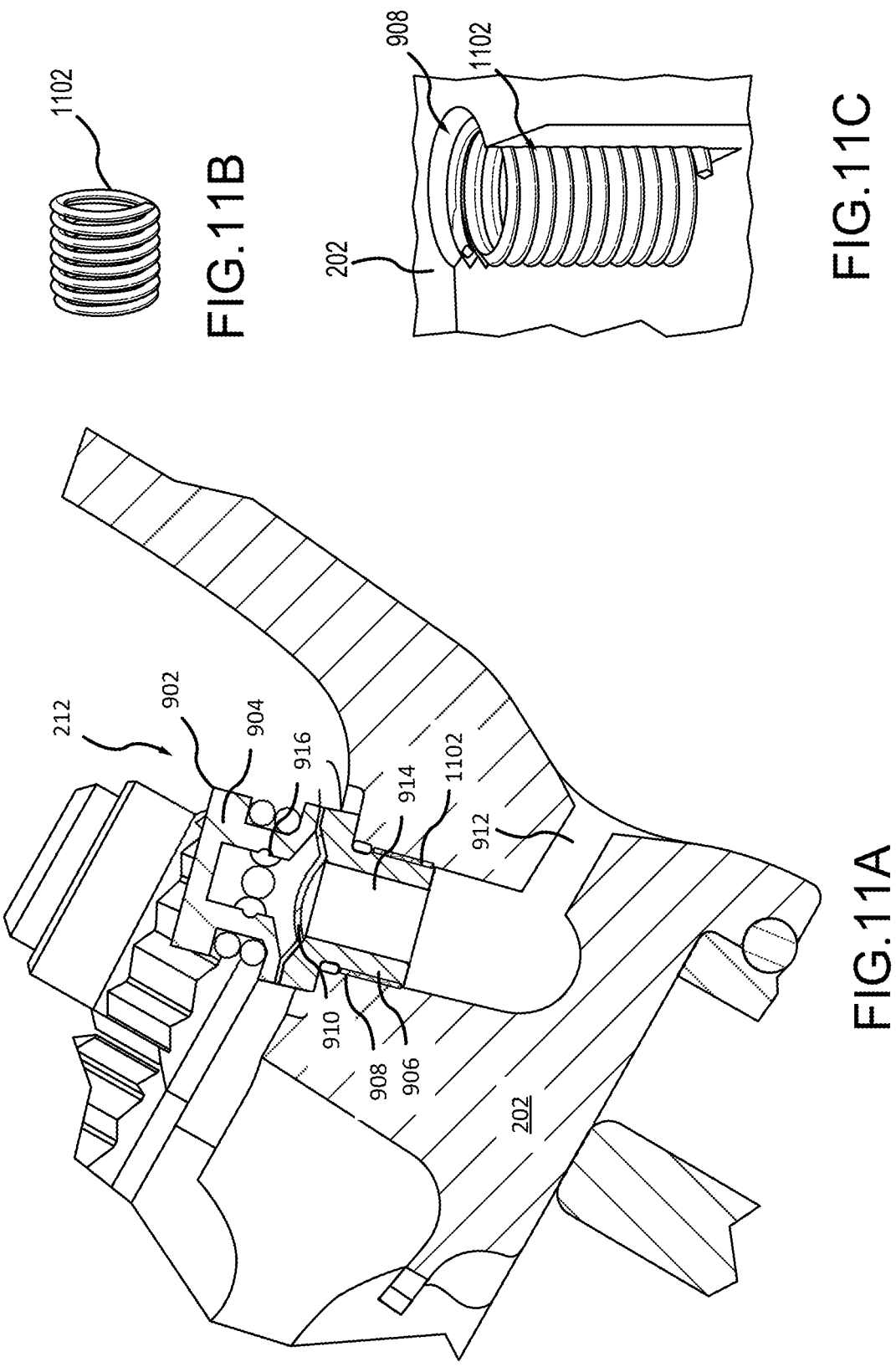
FIG. 11A illustrates a cross-sectional view of the over-inflation pressure relief valve taken along section line D-D of the wheel assembly of FIG. 2B, in accordance with various embodiments.
FIGS. 11B and 11C illustrate a threaded corrosion mitigation device of FIG. 11A, in accordance with various embodiments.

Referring now to FIG. 11A, a cross-sectional view of the over-inflation pressure relief valve 212 taken along section line D-D of the wheel assembly 200 of FIG. 2B is illustrated, in accordance with various embodiments. In various embodiments, the over-inflation pressure relief valve 212 may include a post 902 that includes a first portion 904 and a second portion 906. In various embodiments, the second portion 906 may be removably fitted within a boundary defining a void 908 of the second wheel portion 202, such as by threaded attachment. In various embodiments, the post 902 may include a diaphragm 910. In various embodiments, the diaphragm 910 is seated when the tire cavity air pressure is at or below the rated pressure for the tire. In various embodiments, when the tire cavity air pressure rises above a desired air pressure level in the tire, the diaphragm 910 rises allow in air to move from the air channel 912 of the second wheel portion 202 through the air channel 914 located generally along the long axis of the post 902 and out through boundaries defining voids 916 in the first portion 904 of the post 902. In various embodiments, mounting of a second portion 906 of the post 902 into the boundary defining the void 908 of the second wheel portion 202 may allow air to flow between the air channel 914 of the post 902 and air channel 912 of the second wheel portion 202. In various embodiments, the over-inflation pressure relief valve 212 may further include corrosion mitigation device 1102. In various embodiments, corrosion mitigation device 1102 may be a threaded insert with a helical shape, such as a helical coil as illustrated in FIG. 11B. The corrosion mitigation device 1102 is inserted into threads of the boundary defining the void 908 of the second wheel portion 202, as illustrated in FIG. 11C, with the second portion 906 threading into the corrosion mitigation device 1102. In various embodiments, the corrosion mitigation device 1102 is an anodic device or a desiccant device, among others that absorbs moisture to mitigate corrosion within the pneumatic port.

Thus, the various embodiments provide a pneumatic port assembly that includes a corrosion mitigation device, such as an anodic device or a desiccant device, among others, to mitigate corrosion within the pneumatic port due to moisture that may enter areas of the pneumatic port. In various embodiments, the corrosion mitigation device may be in the form of a tubular shaped insert, an annular shaped insert, or a threaded insert, among others, that are easily replaceable during maintenance. In various embodiments, the use of one or more of the corrosion mitigation devices described above, may reduce maintenance, repair, and operation (MRO) costs and lead-times, increase the serviceable life of aircraft wheels, reduced scrap, and reduce replacement part demand.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A wheel assembly, comprising:
   a wheel comprising a tube-well and a face, the tube-well configured to receive a tire;
   an air channel within the wheel, the air channel extending from a face of the wheel to the tube-well, the air channel having a first end at the face of the wheel and a second end at the tube-well;
   a valve, the valve positioned within the air channel at the first end of the air channel; and
   a corrosion mitigation device, the corrosion mitigation device independent from the valve and positioned within the air channel between a second end of the air channel and the valve, wherein the corrosion mitigation device is spaced from the valve.

2. The wheel assembly of claim 1, wherein the corrosion mitigation device is positioned within a void at the first end to the air channel, wherein the corrosion mitigation device and the valve are positioned within the void.

3. The wheel assembly of claim 2, wherein the corrosion mitigation device is annular shaped.

4. The wheel assembly of claim 1, wherein the corrosion mitigation device is positioned adjacent the second end of the air channel within the air channel.

5. The wheel assembly of claim 4, wherein the corrosion mitigation device is tubular shaped.

6. The wheel assembly of claim 1, wherein the corrosion mitigation device is positioned between threads within a void at the first end of the air channel and threads on an exterior of the valve.

7. The wheel assembly of claim 6, wherein the corrosion mitigation device is helically shaped to align with the threads of the wheel assembly and the threads on the exterior of the valve.

8. The wheel assembly of claim 1, wherein the corrosion mitigation device is an anodic device.

9. The wheel assembly of claim 1, wherein the corrosion mitigation device is a desiccant device.

10. A landing gear of an aircraft, comprising:
    a wheel assembly, the wheel assembly comprising:
    a wheel comprising a tube-well and a face, the tube-well configured to receive a tire;
    an air channel within the wheel, the air channel extending from a face of the wheel to the tube-well, the air channel having a first end at the face of the wheel and a second end at the tube-well;
    a valve, the valve positioned within the air channel at the first end of the air channel; and
    a corrosion mitigation device, the corrosion mitigation device independent from the valve and positioned within the air channel between a second end of the air channel and the valve, wherein the corrosion mitigation device is spaced from the valve.

11. The landing gear of claim 10, wherein the corrosion mitigation device is positioned within a void at the first end to the air channel, wherein the corrosion mitigation device and the valve are positioned within the void.

12. The landing gear of claim 11, wherein the corrosion mitigation device is annular shaped.

13. The landing gear of claim 10, wherein the corrosion mitigation device is positioned adjacent the second end of the air channel within the air channel.

14. The landing gear of claim 13, wherein the corrosion mitigation device is tubular shaped.

15. The landing gear of claim 10, wherein the corrosion mitigation device is positioned between threads within a void at the first end of the air channel and threads on an exterior of the valve.

16. The landing gear of claim 15, wherein the corrosion mitigation device is helically shaped to align with the threads of the wheel assembly and the threads on the exterior of the valve.

17. The landing gear of claim 10, wherein the corrosion mitigation device is an anodic device.

18. The landing gear of claim 10, wherein the corrosion mitigation device is a desiccant device.

19. An aircraft comprising:

a landing gear, wherein the landing gear comprises a wheel assembly, the wheel assembly comprising:

a wheel comprising a tube-well and a face, the tube-well configured to receive a tire;

an air channel within the wheel, the air channel extending from a face of the wheel to the tube-well, the air channel having a first end at the face of the wheel and a second end at the tube-well;

a valve, the valve positioned within the air channel at the first end of the air channel; and a corrosion mitigation device, the corrosion mitigation device independent from the valve and positioned within the air channel between a second end of the air channel and the valve, wherein the corrosion mitigation device is spaced from the valve.

20. The aircraft of claim 19, wherein the corrosion mitigation device is an anodic device or a desiccant device.

\* \* \* \* \*